(12) United States Patent
Chen et al.

(10) Patent No.: US 11,084,365 B2
(45) Date of Patent: Aug. 10, 2021

(54) CLOUD STORAGE-BASED SYSTEM AND METHOD FOR ELECTRIC VEHICLE BATTERY EXCHANGE

(71) Applicant: NIO (ANHUI) HOLDING CO., LTD., Hefei (CN)

(72) Inventors: Fei Chen, Hong Kong (CN); Shijing Li, Hong Kong (CN); Xiaojia Deng, Hong Kong (CN)

(73) Assignee: NIO (ANHUI) HOLDING CO., LTD., Hefei (CN)

(*) Notice: Subject to any disclaimer, the term of this patent is extended or adjusted under 35 U.S.C. 154(b) by 444 days.

(21) Appl. No.: 16/086,125

(22) PCT Filed: Mar. 10, 2017

(86) PCT No.: PCT/CN2017/076219
§ 371 (c)(1),
(2) Date: Nov. 15, 2018

(87) PCT Pub. No.: WO2017/157245
PCT Pub. Date: Sep. 21, 2017

(65) Prior Publication Data
US 2020/0198494 A1 Jun. 25, 2020

(30) Foreign Application Priority Data
Mar. 18, 2016 (CN) .......................... 201610158141.5

(51) Int. Cl.
*H02J 7/00* (2006.01)
*B60K 1/04* (2019.01)
(Continued)

(52) U.S. Cl.
CPC ............... *B60K 1/04* (2013.01); *B60L 53/65* (2019.02); *B60L 53/66* (2019.02); *B60L 53/80* (2019.02);
(Continued)

(58) Field of Classification Search
None
See application file for complete search history.

(56) References Cited

U.S. PATENT DOCUMENTS

| 2003/0002243 A1* | 1/2003 | Newman | G06F 1/1632 |
| | | | 361/679.03 |
| 2010/0049737 A1* | 2/2010 | Ambrosio | B60L 53/65 |
| | | | 705/412 |

(Continued)

FOREIGN PATENT DOCUMENTS

| CN | 101952137 | 1/2011 |
| CN | 202059188 | 11/2011 |

(Continued)

OTHER PUBLICATIONS

International Search Report and Written Opinion prepared by the State Intellectual Property Office of the P.R. China dated May 10, 2017 for International Application No. PCT/CN2017/076219.

*Primary Examiner* — Arun C Williams
(74) *Attorney, Agent, or Firm* — Sheridan Ross P.C.

(57) ABSTRACT

Disclosed is a cloud storage-based battery swap system for an electric vehicle, which is intended to solve the problems of the existing electric vehicles, such as inconvenient use of an energy supply system, and excessive individual difference and excessive cost of a battery pack. The system comprises: a battery pack information storage apparatus for storing battery pack information of an electric vehicle; a battery pack allocation station for storing battery packs and charging the battery packs; and a battery swap station for replacing a battery pack for the electric vehicle, and communicating with the battery pack information storage apparatus to transmit the battery pack information to the battery pack information storage apparatus. In addition, a battery management system for the battery pack is disposed on the electric vehicle outside the battery pack. Also disclosed is a (Continued)

method for the system. The system and the method not only make the energy supply of the electric vehicle more convenient, but also reduce the battery pack supply cost, thereby making the large-scale construction of battery swap stations become possible.

16 Claims, 3 Drawing Sheets

(51) Int. Cl.
    *B60L 58/12*     (2019.01)
    *B60L 53/80*     (2019.01)
    *B60L 53/66*     (2019.01)
    *B60L 58/16*     (2019.01)
    *B60L 53/65*     (2019.01)
    *B60S 5/06*     (2019.01)
    *H01M 10/42*     (2006.01)
    *H01M 10/44*     (2006.01)
    *H01M 10/48*     (2006.01)

(52) U.S. Cl.
    CPC ............... *B60L 58/12* (2019.02); *B60L 58/16* (2019.02); *B60S 5/06* (2013.01); *H01M 10/425* (2013.01); *H01M 10/441* (2013.01); *H01M 10/48* (2013.01); *H02J 7/005* (2020.01); *H02J 7/00036* (2020.01); *H02J 7/0048* (2020.01); *B60K 2001/0455* (2013.01); *B60L 2240/70* (2013.01); *H01M 2010/4271* (2013.01); *H01M 2010/4278* (2013.01); *H01M 2220/20* (2013.01)

(56) References Cited

U.S. PATENT DOCUMENTS

| | | | | |
|---|---|---|---|---|
| 2010/0094496 | A1* | 4/2010 | Hershkovitz | B60L 3/12 |
| | | | | 701/22 |
| 2011/0215758 | A1* | 9/2011 | Stahlin | G07C 5/008 |
| | | | | 320/109 |
| 2012/0049621 | A1* | 3/2012 | Shinoda | B60L 53/305 |
| | | | | 307/10.1 |
| 2012/0101755 | A1* | 4/2012 | Hirasawa | G06Q 30/0645 |
| | | | | 702/63 |
| 2012/0233850 | A1* | 9/2012 | Hozumi | B60L 53/80 |
| | | | | 29/729 |
| 2014/0320144 | A1* | 10/2014 | Nakaya | G01R 31/392 |
| | | | | 324/434 |
| 2015/0127479 | A1* | 5/2015 | Penilla | B60L 53/31 |
| | | | | 705/26.1 |
| 2015/0149015 | A1* | 5/2015 | Nakano | B60L 58/12 |
| | | | | 701/22 |
| 2015/0306967 | A1 | 10/2015 | Cohen | |
| 2016/0001748 | A1* | 1/2016 | Moskowitz | B60L 53/80 |
| | | | | 701/22 |
| 2016/0039299 | A1 | 2/2016 | Nguyen | |

FOREIGN PATENT DOCUMENTS

| | | |
|---|---|---|
| CN | 102970322 | 3/2013 |
| CN | 105182884 | 12/2015 |
| CN | 105667464 | 6/2016 |

\* cited by examiner

CLOUD STORAGE-BASED SYSTEM AND METHOD FOR ELECTRIC VEHICLE BATTERY EXCHANGE

CROSS REFERENCE TO RELATED APPLICATIONS

This application is a national stage application under 35 U.S.C. 371 and claims the benefit of PCT Application No. PCT/CN2017/076219 having an international filing date of 10 Mar. 2017, which designated the United States, which PCT application claimed the benefit of China Patent Application No. 201610158141.5 filed 18 Mar. 2016, the disclosure of each of which are incorporated herein by reference.

TECHNICAL FIELD

The invention relates to an electric vehicle, and in particular provides a cloud storage-based battery swap system and method for an electric vehicle.

BACKGROUND ART

At present, with the rapid popularization of new energy vehicles, especially purely electric vehicles, in the world, especially in China, problems such as a low charging speed, a small number of charging stations (charging piles), a low battery swap speed, a small number and an unreasonable distribution of battery swap stations, and users' concerns about battery pack differences have become the biggest bottleneck restricting the convenience in daily use and further popularization of electric vehicles.

In general, the charging speed is restricted by the electrochemical characteristics of the battery itself and the grid node power, so battery swap is an ideal choice and is more in line with the habits of traditional vehicle users. However, there are huge individual differences among batteries due to differences in manufacturers, standards, usage time, and usage environment for the batteries themselves, and in electrical and mechanical interfaces of battery packs and battery management system interfaces of vehicles. Therefore, it is the current mainstream that the construction of battery swap stations is led by one automobile manufacturer or several automobile manufacturers for joint manufacturing, rather than battery companies.

Due to the uncertainty in vehicle's battery swap frequency and location, in order to improve the customer satisfaction, the number of spare battery packs in the battery swap station needs to be much higher than the number of electric vehicles. Therefore, reducing the cost of the battery pack itself is the only way for enterprises or organizations to rapidly expand the scale of battery swap stations and promote the application of electric vehicles. At the same time, reducing the complexity of battery swap interfaces (electrical, mechanical, or communication interfaces) is also an effective means to reduce the technical difficulty of the popularization of battery swap stations and reduce the cost.

In addition, when to replace the battery pack, to what point of the service life to replace the battery pack, and how much is left in the capacity to replace the battery pack should depend on the user's need. Therefore, how to calculate the cost of battery swap, how to pay more conveniently, how to ensure the user to confidently replace the pack without worrying about the quality of the replaced battery pack, and the tracking management of parameters of the battery pack throughout its life cycle are all necessary conditions to promote battery swap.

In summary, the existing energy supply systems for an electric vehicle has the following problems: the information about a battery pack itself is stored in a battery management system in the pack, which increases the battery pack supply cost; the information in the battery management system only interacts with the vehicle itself and cannot interact with the battery swap system; the battery pack information is not connected to the Internet, which affects the reasonable allocation and management of battery packs; the payment cannot be in close relation with information such as battery pack life and capacity; the user cannot know the distribution and supply of battery packs in real time, and cannot predict when and where to swap the battery; and the battery pack has complex interfaces, which affects the battery swap speed.

Accordingly, there is a need in the art for a new battery swap system and method for an electric vehicle to solve the problems.

SUMMARY OF THE INVENTION

The invention is intended to solve the above problems in the prior art, that is, to solve the problems of the existing electric vehicles, such as inconvenient use of an energy supply system, and excessive individual difference and excessive cost of a battery pack. For this purpose, the invention provides the following technical solutions.

Solution 1: a cloud storage-based battery swap system for an electric vehicle, comprising: a battery pack information storage apparatus for storing battery pack information of an electric vehicle; a battery pack allocation station communicating with the battery pack information storage apparatus to acquire the battery pack information in the battery pack information storage apparatus in real time; and a battery swap station, for physically storing battery packs, charging the battery packs and replacing a battery pack for the electric vehicle, and also communicating with the battery pack information storage apparatus to transmit the battery pack information in the battery swap station to the battery pack information storage apparatus.

Solution 2: the battery swap system for an electric vehicle according to solution 1, wherein the battery pack information storage apparatus is capable of communicating with the electric vehicle to receive vehicle-mounted battery pack information from the electric vehicle.

Solution 3: the battery swap system for an electric vehicle according to solution 2, wherein the battery pack allocation station also communicates with a user of the electric vehicle so that the user can know the distribution of battery packs in real time.

Solution 4: the battery swap system for an electric vehicle according to solution 3, wherein the battery pack information storage apparatus is a battery pack information cloud server.

Solution 5: the battery swap system for an electric vehicle according to solution 4, wherein the battery swap station further comprises a battery swap station battery pack data server that communicates with the battery pack information cloud server to transmit the battery pack information in the battery swap station to the battery pack information cloud server.

Solution 6: the battery swap system for an electric vehicle according to any one of solutions 1 to 5, wherein a battery management system for each battery pack is independently disposed on a vehicle body of the electric vehicle outside the battery pack.

Solution 7: the battery swap system for an electric vehicle according to solution 6, wherein when the battery pack is replaced, the battery swap apparatus in the battery swap station communicates with the battery management system for the battery pack.

Solution 8: the battery swap system for an electric vehicle according to solution 7, wherein the battery swap apparatus in the battery swap station communicates with the battery management system for the battery pack via a CAN bus.

Solution 9: the battery swap system for an electric vehicle according to any one of solutions 6 to 8, wherein the battery management system communicates with high-voltage controllers and module controllers inside the battery pack via the CAN to save the battery pack information.

Solution 10: the battery swap system for an electric vehicle according to any one of solutions 1 to 9, wherein the battery pack information comprises a voltage, a state of charging, a state of health, a state of function, the number of relay's opening and closing actions, a service life, working conditions, information before leaving the factory, and a saved transportation history.

Solution 11: a cloud storage-based battery swap method for an electric vehicle, comprising: storing battery pack information of an electric vehicle using a battery pack information storage apparatus; a battery pack allocation station communicating with the battery pack information storage apparatus to acquire the battery pack information in the battery pack information storage apparatus in real time; and physically storing battery packs, charging the battery packs and replacing a battery pack for the electric vehicle using a battery swap station, and the battery swap station further communicating with the battery pack information storage apparatus to transmit battery pack information in the battery swap station to the battery pack information storage apparatus.

Solution 12: the battery swap method for an electric vehicle according to solution 11, further comprising: the battery pack information storage apparatus communicating with the electric vehicle to receive vehicle-mounted battery pack information from the electric vehicle.

Solution 13: the battery swap method for an electric vehicle according to solution 12, further comprising: the battery pack allocation station communicating with a user of the electric vehicle so that the user can know the distribution of battery packs in real time.

Solution 14: the battery swap method for an electric vehicle according to solution 13, wherein the battery pack information storage apparatus is a battery pack information cloud server.

Solution 15: the battery swap method for an electric vehicle according to solution 14, wherein the battery swap station further comprises a battery swap station battery pack data server that communicates with the battery pack information cloud server to transmit the battery pack information in the battery swap station to the battery pack information cloud server.

Solution 16: the battery swap method for an electric vehicle according to any one of solutions 11 to 15, wherein a battery management system for each battery pack is independently disposed on a vehicle body of the electric vehicle outside the battery pack.

Solution 17: the battery swap method for an electric vehicle according to solution 16, wherein when the battery pack is replaced, the battery swap apparatus in the battery swap station communicates with the battery management system for the battery pack.

Solution 18: the battery swap method for an electric vehicle according to solution 17, wherein the battery swap apparatus in the battery swap station communicates with the battery management system for the battery pack via the CAN.

Solution 19: the battery swap method for an electric vehicle according to any one of solutions 16 to 18, wherein the battery management system communicates with high-voltage controllers and module controllers inside the battery pack via the CAN to save the battery pack information.

Solution 20: the battery swap method for an electric vehicle according to any one of solutions 11 to 19, wherein the battery pack information comprises a voltage, a state of charging, a state of health, a state of function, the number of relay's opening and closing actions, a service life, working conditions, information before leaving the factory, and a saved transportation history.

It will be readily understood by those skilled in the art that, in the case of adopting the technical solutions of the invention, a user can communicate with a battery pack allocation station or a battery pack information cloud server through the Internet of Vehicles to know the battery pack distribution information, thereby proactively selecting battery packs with different prices, capacities and service lives according to their own needs. In addition, since the hardware of the battery management system (BMS) is disposed on the vehicle body, the invention can avoid the problems such as BMS hardware damage, software failure and information leakage caused during the use and replacement of the battery pack. At the same time, the hardware of the battery management system (BMS) is disposed on the vehicle body, which also reduces the cost of the battery pack itself and simplifies the battery swap interfaces, thereby making the large-scale construction of battery swap stations become possible.

DETAILED DESCRIPTION OF EMBODIMENTS

The preferred embodiments of the invention are described below with reference to the accompanying drawings. It should be understood by those skilled in the art that these embodiments are only for explaining the basic principle of the invention, and are not intended to limit the scope of protection of the invention. For example, although the battery swap method for an electric vehicle is described in a particular order in the present application, it would have been readily understood by those skilled in the art that the method of the invention can obviously be executed in an order different from the order described above, without departing from the basic principles of the invention.

Figure 1:
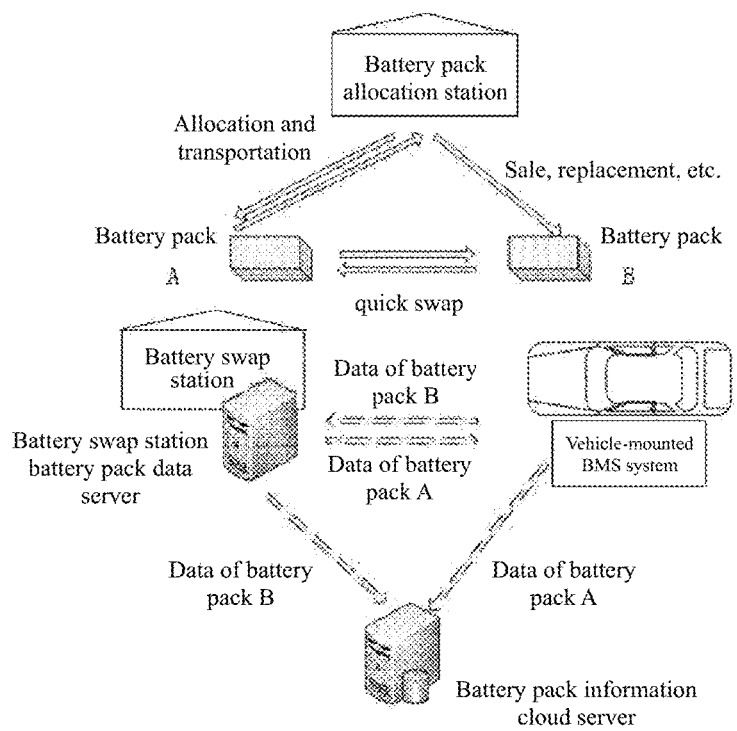
FIG. 1 is a schematic diagram of information transmission of a battery swap system for an electric vehicle of the invention.

Referring first to FIG. 1, this figure shows a schematic diagram of information transmission of a battery swap system for an electric vehicle of the invention. As shown in FIG. 1, a cloud storage-based battery swap system for an electric vehicle of the invention comprises: a battery pack information cloud server for storing battery pack information of an electric vehicle; a battery pack allocation station communicating with the battery pack information cloud server to acquire the battery pack information in real time; and a battery swap station, for physically storing battery packs, charging the battery packs and replacing a battery pack for the electric vehicle, and also communicating with the battery pack information cloud server to transmit the battery pack information in the battery swap station to the battery pack information cloud server.

Preferably, as shown in FIG. 1, the battery pack information cloud server can also communicate with the electric vehicle to receive information about a vehicle-mounted battery pack A from the electric vehicle. In addition, the battery pack allocation station can communicate with a user of the electric vehicle so that the user can know the distribution of battery packs in real time. Furthermore, as shown in FIG. 1, the battery swap station further comprises a battery swap station battery pack data server that communicates with the battery pack information cloud server to transmit the information about a replaced battery pack B to the battery pack information cloud server.

Figure 3:
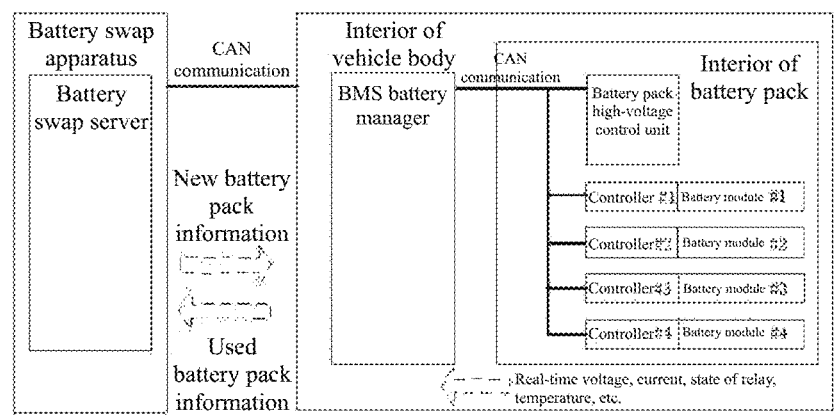
FIG. 3 is a schematic diagram of a battery swap interface of a battery swap system for an electric vehicle of the invention.

Referring now to FIG. 3, in the technical solutions of the invention, the battery management system (BMS) for each battery pack is independently positioned on hardware on the vehicle body of the electric vehicle outside the battery pack. This not only reduces the cost of each battery pack, but also eliminates the damage to hardware of the battery management system (BMS) during the replacement of the battery pack. Accordingly, as shown in FIG. 3, the battery management system BMS communicates with a high-voltage control unit and module controllers 1-4 inside the battery pack via the CAN for acquiring and storing the battery pack information, such as a voltage, a current, a state of relay, and temperature. When battery swap is performed in the battery swap station, the battery swap apparatus connects a battery swap station server with the vehicle-mounted BMS via the CAN to perform battery pack information interaction, that is, the power swap server acquires the information about the replaced used battery pack and transmits the information about the new battery pack to be replaced to the battery management system (BMS), and when the replaced battery pack B is under maintenance such as charging and discharging, the power station server will update the battery pack information and upload same to the battery pack information cloud server.

It will be readily understood by those skilled in the art that the battery pack information comprises, but is not limited to, a voltage, a state of charging (SOC), a state of health (SOH), a state of function (SOF), the number of relay's opening and closing actions, a service life, working conditions, information before leaving the factory, a saved transportation history, etc.

In another aspect, the invention also provides a cloud storage-based battery swap method for an electric vehicle. The method comprises: storing battery pack information of an electric vehicle using a battery pack information cloud server; a battery pack allocation station communicating with the battery pack information cloud server to acquire the battery pack information in real time; and physically storing battery packs, charging the battery packs and replacing a battery pack for the electric vehicle using a battery swap station, and the battery swap station further communicating with the battery pack information cloud server to transmit battery pack information in the battery swap station to the battery pack information cloud server. Similar to the above system solutions, the step of storing battery pack information of an electric vehicle using the battery pack information cloud server further comprises communicating the battery pack information cloud server with the electric vehicle to transmit vehicle-mounted battery pack information to the battery pack information cloud server. The method also comprises he battery pack allocation station communicating with a user of the electric vehicle so that the user can know the distribution of battery packs in real time. In addition, the battery swap station further comprises a battery swap station battery pack data server, and the method further comprises the battery swap station battery pack data server communicating with the battery pack information cloud server to transmit the battery pack information in the battery swap station to the battery pack information cloud server. The method also comprises: the battery management system for each battery pack being independently disposed on hardware on a vehicle body of the electric vehicle outside the battery pack, and the battery management system communicating with high-voltage controllers and module controllers inside the battery pack via the CAN to save the battery pack information.

In summary, the invention provides a complete set of solutions of batter swap software and hardware, and the overall system comprises a battery pack, a battery management system (BMS), a cloud storage system, a battery swap station interface system, etc. Each battery pack has a unique serial number (ID) before leaving the factory, which is stored in the battery pack information cloud server, and the battery pack information cloud server stores and tracks various parameters of the battery pack. In the vehicle, the battery pack is physically separated on hardware from the battery management system (BMS). Specifically, the hardware of the battery management system (BMS) is disposed on the vehicle body outside the battery pack. The battery management system (BMS) communicates with the high-voltage controllers and module controllers inside the battery pack via the CAN to save battery pack information, including a voltage, SOC, SOH, SOF, the number of relay's opening and closing actions, a service life and working conditions, information before leaving the factory, a saved transportation history, etc., and the battery management system (BMS) can interact with the battery pack information server through the Internet of Vehicles. When battery swap is performed in the battery swap station, the battery swap apparatus performs battery pack information interaction with the vehicle-mounted BMS via the CAN and, when the replaced battery pack is under maintenance such as charging and discharging, updates the battery pack information and uploads same to the battery pack information cloud server.

Figure 2:
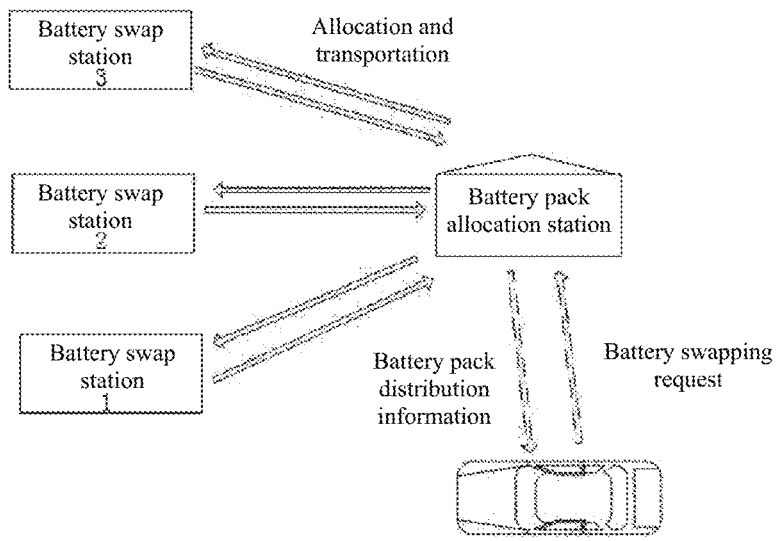
FIG. 2 is a schematic diagram of an allocation system of a battery swap system for an electric vehicle of the invention.

In addition, as shown in FIG. 2, the user can communicate with the battery pack allocation station or the battery pack information cloud server through the Internet of Vehicles to know the battery pack distribution information, thereby selecting battery packs with different prices, capacities and service lives according to their own needs. The user can also actively propose and upload a battery swap request to the cloud server to make an appointment for battery swap, and the battery pack allocation station makes a logistics response and assigns any one of battery swap stations 1-3 to provide the battery pack replacement service for the customer.

Finally, the battery pack of the invention does not contain the hardware of battery management system (BMS), which avoids the problems such as hardware damage, software failure and information leakage easily caused during the use and replacement of the battery pack. At the same time, the hardware of the battery management system (BMS) is disposed on the vehicle body, which also reduces the cost of the battery pack and simplifies the battery swap interfaces, thereby making the large-scale construction of battery swap stations become possible.

Heretofore, the technical solutions of the invention have been described with reference to the preferred embodiments shown in the accompanying drawings. However, those skilled in the art can readily understand that the scope of protection of the invention is obviously not limited to these specific embodiments. Without departing from the principle of the invention, a person skilled in the art may make equivalent modifications or substitutions to related technical features, and the technical solutions after these modifications or substitutions fall into the scope of protection of the invention.

What is claimed is:

1. A cloud storage-based battery swap system for an electric vehicle, comprising:
    a battery pack information storage apparatus for storing battery pack information of an electric vehicle;
    a battery pack allocation station communicating with the battery pack information storage apparatus to acquire the battery pack information in the battery pack information storage apparatus in real time; and
    a battery swap station, for physically storing battery packs, charging the battery packs and replacing a battery pack for the electric vehicle, and also communicating with the battery pack information storage apparatus to transmit battery pack information in the battery swap station to the battery pack information storage apparatus, wherein a battery management system for each battery pack is independently disposed on a vehicle body of the electric vehicle outside the battery pack, when the battery pack is replaced, the battery swap apparatus in the battery swap station communicates with the battery management system for the battery pack.

2. The battery swap system for an electric vehicle according to claim 1, wherein the battery pack information storage apparatus is capable of communicating with the electric vehicle to receive vehicle-mounted battery pack information from the electric vehicle.

3. The battery swap system for an electric vehicle according to claim 2, wherein the battery pack allocation station also communicates with a user of the electric vehicle so that the user can know the distribution of battery packs in real time.

4. The battery swap system for an electric vehicle according to claim 3, wherein the battery pack information storage apparatus is a battery pack information cloud server.

5. The battery swap system for an electric vehicle according to claim 4, wherein the battery swap station further comprises a battery swap station battery pack data server that communicates with the battery pack information cloud server to transmit the battery pack information in the battery swap station to the battery pack information cloud server.

6. The battery swap system for an electric vehicle according to claim 1, wherein the battery swap apparatus in the battery swap station communicates with the battery management system for the battery pack via a CAN bus.

7. The battery swap system for an electric vehicle according to claim 1, wherein the battery management system communicates with high-voltage controllers and module controllers inside the battery pack via the CAN to save the battery pack information.

8. The battery swap system for an electric vehicle according to claim 1, wherein the battery pack information comprises voltage, a state of charging, a state of health, a state of function, the number of relay's opening and closing actions, a service life, working conditions, information before leaving the factory, and a saved transportation history.

9. A cloud storage-based battery swap method for an electric vehicle, comprising:
    storing battery pack information of an electric vehicle using a battery pack information storage apparatus;
    a battery pack allocation station communicating with the battery pack information storage apparatus to acquire the battery pack information in the battery pack information storage apparatus in real time; and
    physically storing battery packs, charging the battery packs, and replacing a battery pack for the electric vehicle using a battery swap station, the battery swap station further communicating with the battery pack information storage apparatus to transmit battery pack information in the battery swap station to the battery pack information storage apparatus, wherein a battery management system for each battery pack is independently disposed on a vehicle body of the electric vehicle outside the battery pack, when the battery pack is replaced, the battery swap apparatus in the battery swap station communicates with the battery management system for the battery pack.

10. The battery swap method for an electric vehicle according to claim 9, further comprising: the battery pack information storage apparatus communicating with the electric vehicle to receive vehicle-mounted battery pack information from the electric vehicle.

11. The battery swap method for an electric vehicle according to claim 10, further comprising: the battery pack allocation station communicating with a user of the electric vehicle so that the user can know the distribution of battery packs in real time.

12. The battery swap method for an electric vehicle according to claim 11, wherein the battery pack information storage apparatus is a battery pack information cloud server.

13. The battery swap method for an electric vehicle according to claim 12, wherein the battery swap station further comprises a battery swap station battery pack data server configured to communicate with the battery pack information cloud server to transmit the battery pack information in the battery swap station to the battery pack information cloud server.

14. The battery swap method for an electric vehicle according to claim 9, wherein the battery swap apparatus in the battery swap station communicates with the battery management system for the battery pack via the CAN.

15. The battery swap method for an electric vehicle according to claim 9, wherein the battery management system communicates with high-voltage controllers and module controllers inside the battery pack via the CAN to save the battery pack information.

16. The battery swap method for an electric vehicle according to claim 9, wherein the battery pack information comprises a voltage, a state of charging, a state of health, a state of function, the number of relay's opening and closing actions, a service life, working conditions, information before leaving the factory, and a saved transportation history.

\* \* \* \* \*